(12) United States Patent
Magnuson (10) Patent No.: US 10,107,051 B2
(45) Date of Patent: *Oct. 23, 2018

(54) METHODS AND SYSTEMS FOR TUBULAR VALIDATION

(71) Applicant: Nabors Industries, Inc., Houston, TX (US)

(72) Inventor: Christopher Magnuson, Houston, TX (US)

(73) Assignee: Nabors Industries, Inc., Houston, TX (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/211,553

(22) Filed: Jul. 15, 2016

(65) Prior Publication Data

US 2016/0319610 A1   Nov. 3, 2016

Related U.S. Application Data

(63) Continuation of application No. 14/471,250, filed on Aug. 28, 2014, now Pat. No. 9,394,751.

(51) Int. Cl.
*E21B 47/01* (2012.01)
*E21B 19/14* (2006.01)
(Continued)

(52) U.S. Cl.
CPC ............ *E21B 19/14* (2013.01); *E21B 17/006* (2013.01); *E21B 19/155* (2013.01); *G01G 19/52* (2013.01); *G08B 21/182* (2013.01)

(58) Field of Classification Search
CPC ...... E21B 17/006; E21B 19/14; E21B 19/155; E21B 47/00; E21B 47/01; E21B 47/09;
(Continued)

(56) References Cited

U.S. PATENT DOCUMENTS

| | | |
|---|---|---|
| 4,725,179 A | 2/1988 | Woolslayer et al. |
| 4,854,400 A | 8/1989 | Simpson |

(Continued)

FOREIGN PATENT DOCUMENTS

| | | |
|---|---|---|
| CN | 1224515 A | 7/1999 |
| KR | 1020010032905 A | 4/2001 |

OTHER PUBLICATIONS

International Search Report and Written Opinion dated Jul. 8, 2015 in connection with International Application No. PCT/US2015/024321; 14 pp.

(Continued)

*Primary Examiner* — Hung T Nguyen
(74) *Attorney, Agent, or Firm* — Haynes and Boone, LLP (57) ABSTRACT

Systems, devices, and methods include a racker device and a catwalk structurally arranged to move a tubular or stand about a drilling rig site. A sensing arrangement is cooperatively associated with at least one of the racker device and the catwalk and is configured to sense an aspect of a tubular while the tubular is being handled at the drilling rig and output a signal representative of the aspect of the tubular. A tubular validation system is configured to receive the sensed aspect of the tubular obtained by the sensing arrangement and determine a specification characteristic of the tubular based on the sensed aspect. This may be compared to specification standards to determine whether the tubular or stand should be discarded.

20 Claims, 7 Drawing Sheets

(51) Int. Cl.
*G08B 21/18* (2006.01)
*E21B 17/00* (2006.01)
*E21B 19/15* (2006.01)
*G01G 19/52* (2006.01)

(58) Field of Classification Search
CPC ........ E21B 47/16; E21B 19/22; E21B 19/165; G08B 21/182; G08B 23/00; G01G 19/52
USPC .......... 340/666, 672, 853.1, 854.1; 166/65.1, 166/66, 250.1; 702/6, 9
See application file for complete search history.

(56) References Cited

U.S. PATENT DOCUMENTS

| | | |
|---|---|---|
| 2004/0040746 A1 | 3/2004 | Niedermayr et al. |
| 2004/0162658 A1 | 8/2004 | Newman |
| 2004/0211595 A1 | 10/2004 | Pinckard et al. |
| 2008/0035333 A1 | 2/2008 | Newman |
| 2008/0105427 A1 | 5/2008 | Hampton et al. |
| 2008/0164025 A1 | 7/2008 | Peter |
| 2011/0199228 A1 | 8/2011 | Roddy et al. |
| 2012/0274475 A1* | 11/2012 | Milne ................. E21B 21/08 340/853.1 |
| 2013/0275100 A1* | 10/2013 | Ellis ................. H04N 13/0203 703/2 |
| 2013/0340998 A1 | 12/2013 | Flusche |
| 2014/0012506 A1* | 1/2014 | Adsit ................. E21B 44/00 702/6 |
| 2014/0202769 A1 | 7/2014 | Magnuson |
| 2014/0338973 A1 | 11/2014 | Taylor et al. |
| 2016/0003028 A1* | 1/2016 | Aklestad ............ E21B 47/022 702/6 |

OTHER PUBLICATIONS

Chinese Office Action dated Apr. 3, 2015 for Application No. 201580044266.9, 6 pgs.
Korean Notice of Allowance dated Dec. 26, 2017 for Application No. 10-2017-7008488, 1pg.

* cited by examiner

METHODS AND SYSTEMS FOR TUBULAR VALIDATION

PRIORITY

The present application is a continuation application of U.S. patent application Ser. No. 14/471,250, filed Aug. 28, 2014, titled Methods and Systems for Tubular Validation, now U.S. Pat. No. 9,394,751, which is incorporated herein in its entirety by reference.

TECHNICAL FIELD

The present disclosure is directed to systems, devices, and methods for validating specifications of tubulars to be used in down-hole applications. More specifically, the present disclosure is directed to systems, devices, and methods for validating one or more tubular specifications by taking measurements of a tubular or a stand of tubulars during tubular handling.

BACKGROUND OF THE DISCLOSURE

The exploration and production of hydrocarbons require the use of numerous types of tubulars also referred to as pipe. Tubulars include but are not limited to drill pipes, casings, tubing, Riser and other threadably connectable elements used in well structures. The connection of "strings" of joined tubulars or drill strings is often used to drill a wellbore and, with regards to casing, prevent collapse of the wellbore after drilling. These tubulars are normally assembled in groups of two or more commonly known as "stands" to be vertically stored in the derrick or mast. The derrick or mast may include a storing structure commonly referred to as a fingerboard. Fingerboards typically include a plurality of horizontally elongated support structures or "fingers" each capable of receiving a plurality of "stands."

Rotary drilling and top drive drilling systems often use these stands, instead of single tubulars, to increase efficiency of drilling operations by reducing the amount of connections required to build the drill string in or directly over the wellbore. However, the manipulation of tubulars from a horizontal to a vertical position, assembly of stands and presentation of stands between the fingerboard and well center are dangerous and can be rather inefficient operations.

Since tubulars may be added and removed from drill strings multiple times on the same well, and since some tubulars are reused at different wells, some tubulars may be repetitively exposed to high stress scenarios, leading to earlier than expected failure. Tubular failures delay well progress and increase drilling costs.

During the drilling process, tubulars are subjected to differing loads depending on their location within the drill string. When subjected to loads under tension, these tubulars elongate linearly in relation to the applied load and recover to their original dimensions when the loads are removed. However, if the elastic limit of the tubular is exceeded, then it will not return to its original dimensions and poses a potential failure point. In addition, some tubulars become worn on the inside due to the flow of abrasive drilling fluids. These worn points are often not visible from outside the drill pipe, and also present potential failure points.

In order to identify tubulars that may have been exposed to excessive stress or wear, tubulars that are intended to be re-used on a rig are validated through independent inspections between wells, and prior to be introduced to the drilling rig. Validation requires an inspector to manually measure and record dimensions and specifications of the tubular.

Tubulars exhibiting excessive levels of elongation or deformation may be deemed unsuitable for continued use. However, since tubulars are a consumable commodity and extremely expensive, it is desirable to use as much of their useful life as possible. However, the process of validating by manually measuring each tubular for dimensional discrepancies can be time consuming and tedious work.

Pad drilling, which requires a rig to be on site drilling multiple wells, presents additional challenges for ensuring safe and proper validation for the drill pipe. The time required to remove tubulars from a rig for measurement and quality control can slow the process and decrease efficiency of the drilling operation.

The present disclosure is directed to systems and methods that overcome one or more of the shortcomings of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The systems, devices, and methods described herein may be used to determine specification characteristics of a tubular or a stand of tubulars in order to more reliably predict whether the tubular is approaching the end of its useful life. The specification characteristics relate to technical specifications such as among others, lengths and weight of the tubular or stand, that are detected or sensed using instruments carried on or forming a part of a drilling rig system. In some embodiments, these technical specifications may be realized or measured on-the-fly as the tubular or stand is manipulated about the drilling rig system.

Through these specifications, the systems, devices, and methods disclosed herein validate stands by determining whether they have exceeded their safe working loads and/or their elastic limits. Accordingly, the systems, devices, and methods may be used to identify tubulars that elongate beyond their elastic limit during applied loading, or that otherwise no longer meet one or more required specifications. When drill pipe's elastic limit is exceeded the drill pipe does not return to its normal dimensions and possess a failure point. The ability to identify drill pipe that has exceeded its elastic limit or has been excessively worn can now be a continual process during pipe handling processes to validate the strength and integrity of the drill pipe and drill string. Information obtained during validation may be captured and stored within a database previously described in patent application Ser. No. 14/184,771, which provides for the identification of drill pipe/tubulars for tubular management. Additionally, if the tubular weight has changed, e.g., due to stripping of tubular joint threads, internal wear, or other damage to a tubular that affects its weight, this can also be identified.

In some embodiments, the systems, devices, and methods described herein measure parameters indicative of tubular specifications, such as length or weight of the tubulars, for example. It may do this by direct measurement, such as by using sensors that detect weight of the tubular, or may do this by indirect measurement, such as by detecting the position of an end of the tubular and calculating the length based on the distance from a constant known or a calculated location.

Obtained information relating to the specification characteristic of a particular tubular may be stored and tracked in a database and may be used to form a historical record of changes in length, weight, or other tubular specification characteristics. This information can be an indicator of stress applied to the tubular during previous uses and may be used to predict or estimate the remaining useful life of a particular tubular. With the useful life predicted, this information can also be used to determine whether a tubular may be safely used in a high stress location of a drill string, or whether the tubular should be reserved for use in a lower stress location of the drill string, and ultimately, whether the tubular should be discarded or recycled since it is approaching an end of its useful life. This information may be used as a part of a pipe management plan that may be used to elongate the useful life-time of the tubulars and may reduce costs by extending the life of some drilling consumables without increasing the risk of costly failures, particularly downhole.

Figure 3:
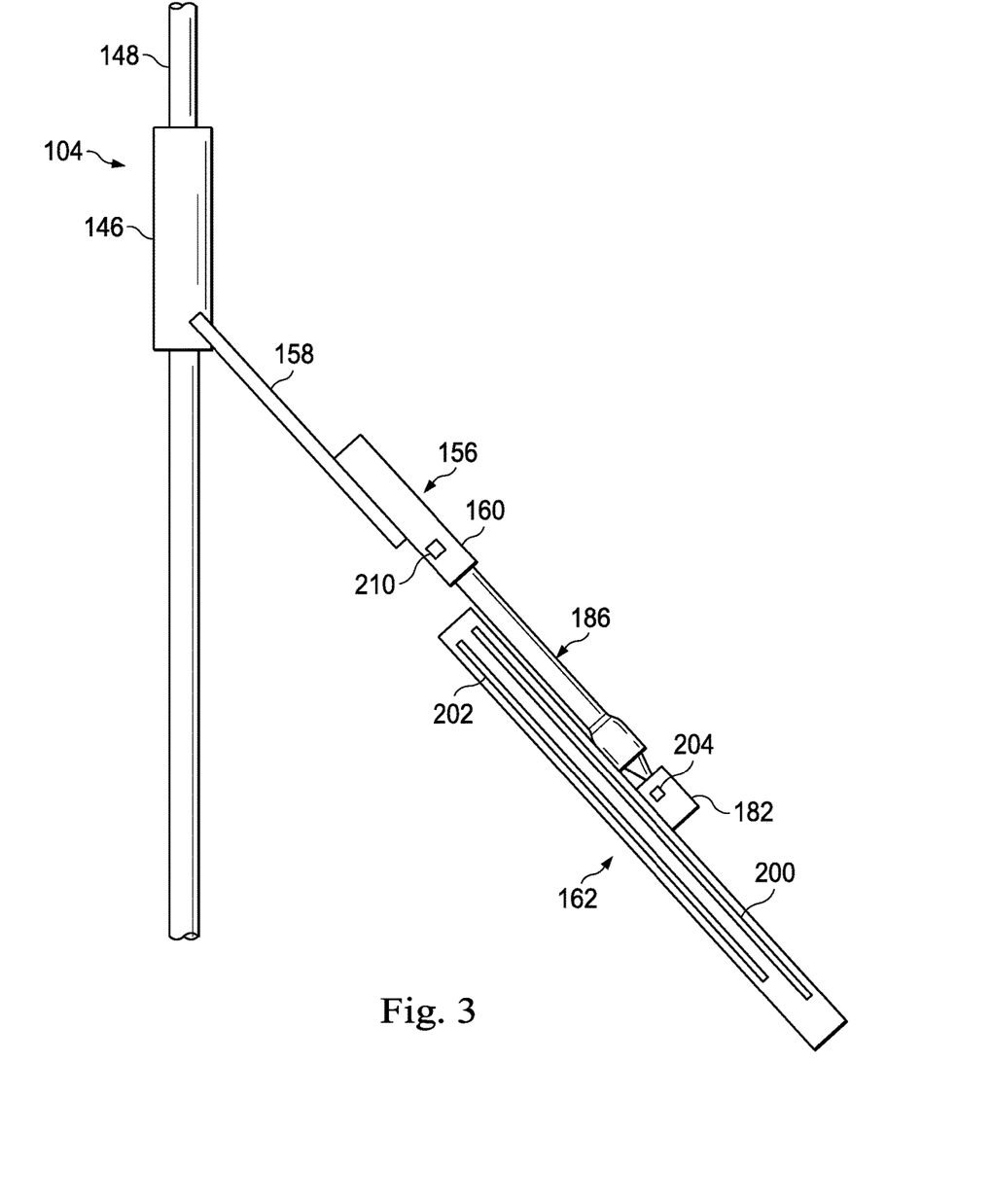
FIG. 3 is a schematic of an exemplary racker device apparatus according to one or more aspects of the present disclosure.
Figure 4:
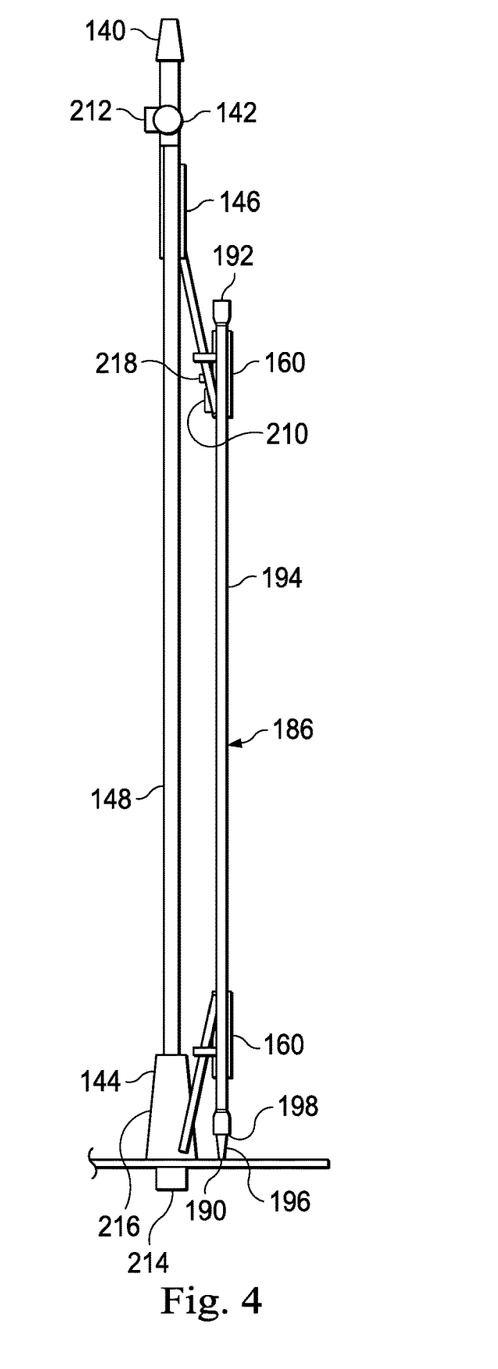
FIG. 4 is a schematic of an exemplary racker device apparatus according to one or more aspects of the present disclosure.
Figure 5:
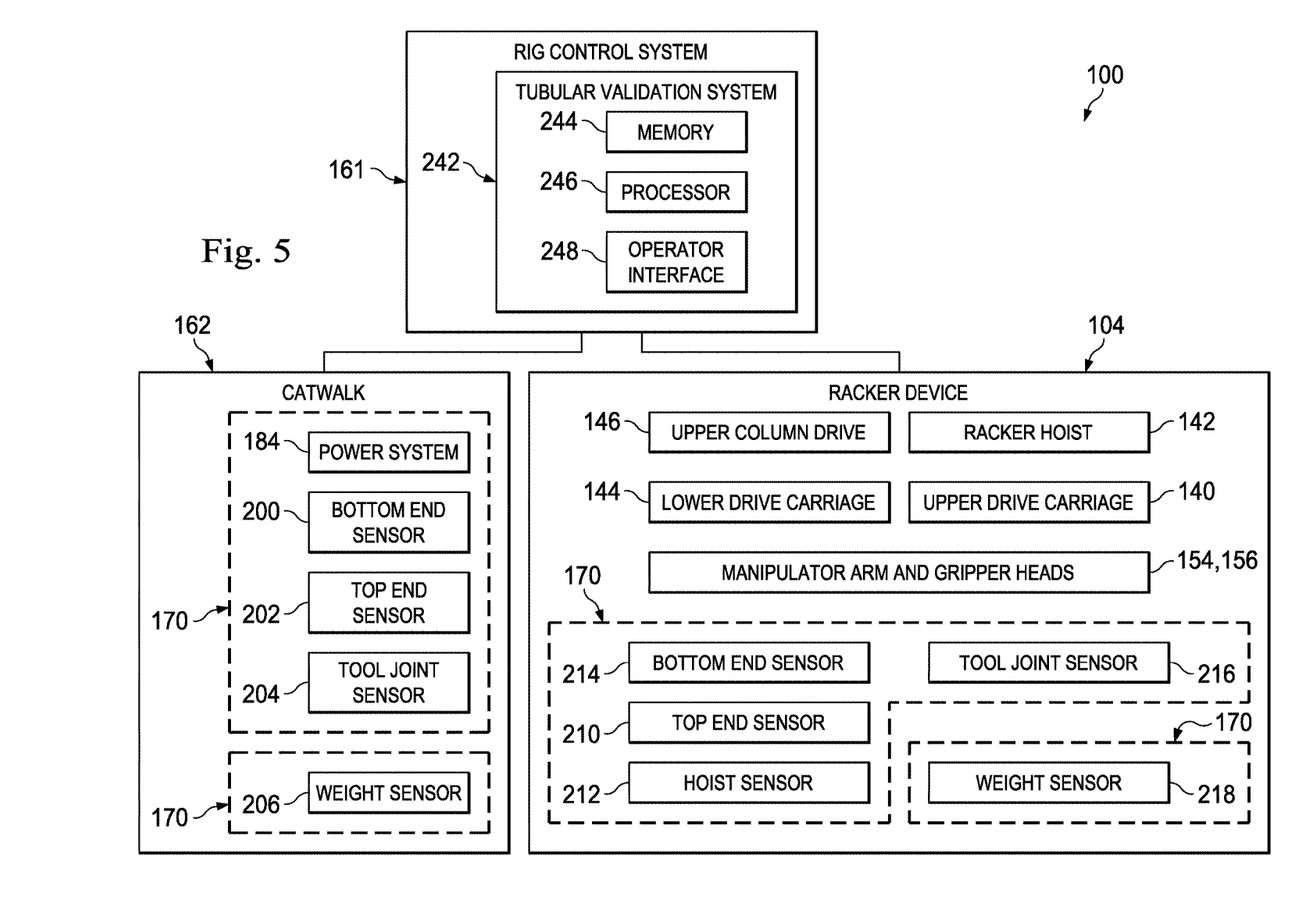
FIG. 5 is a block diagram of an exemplary apparatus according to one or more aspects of the present disclosure.

FIGS. 1-5 show the system 100 of the present disclosure, with FIGS. 1-4 showing different aspects of the overall system and FIG. 5 showing a block diagram identifying exemplary elements of an operating system of the system 100. The system 100 will be described first with reference to FIG. 1. In some examples, the system 100 may form a part of a mobile drilling rig having a drillfloor size of about 35×35 feet, although larger and smaller rigs are contemplated. In some embodiments, the rig is smaller than about 1600 square feet. In other embodiments, the rig is smaller than about 1200 square feet. In some embodiments, the system 100 disclosed herein permits a racker device to be used on rigs that are limited in size.

Figure 1:
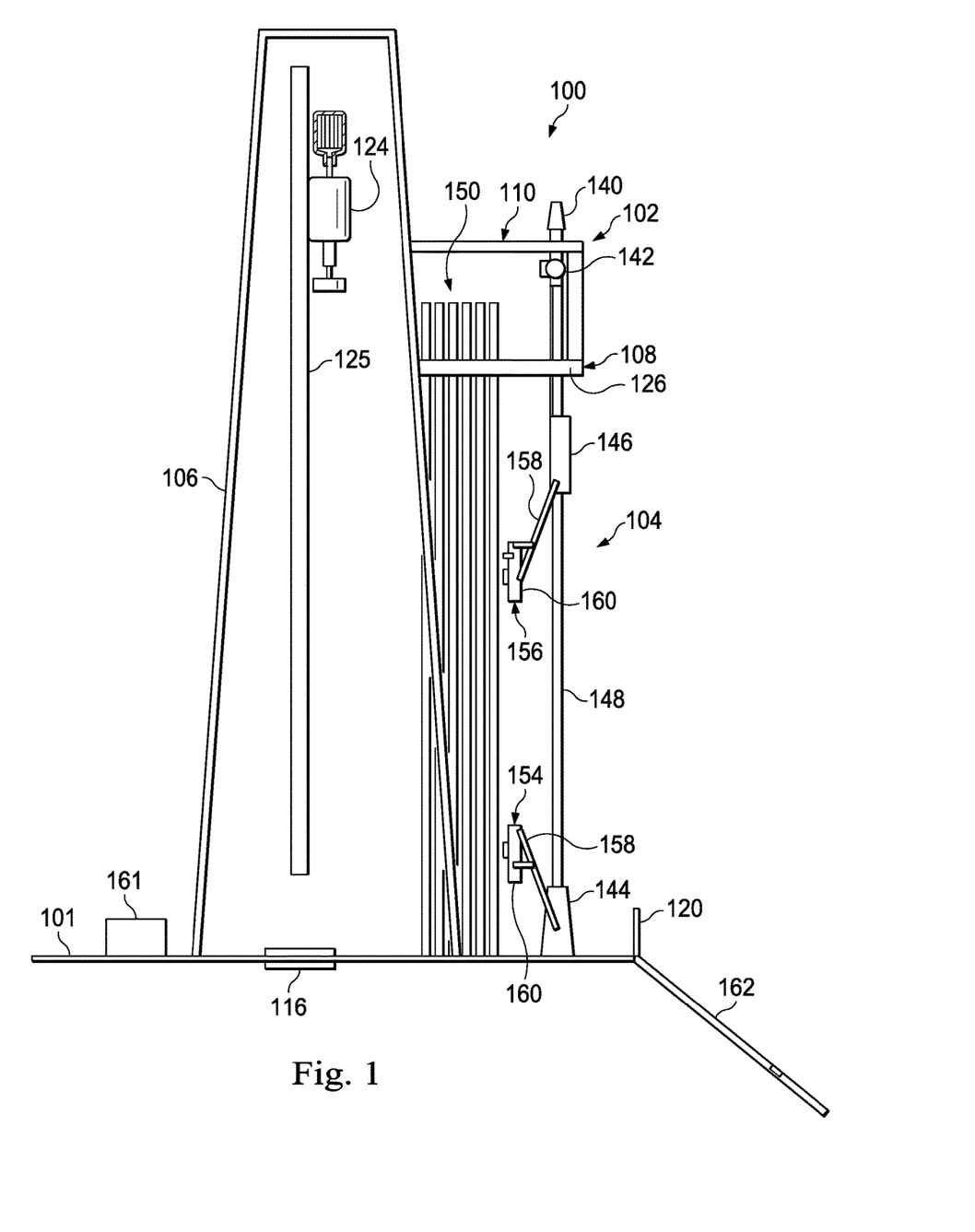
FIG. 1 is a schematic of an exemplary apparatus according to one or more aspects of the present disclosure.

The system 100 shown in FIG. 1 includes a rig 101 with rig based structures and supports 102 and a racker device 104 that operates on the rig based structures and supports 102. The rig based structures and supports 102 include, for example, a mast 106, a fingerboard 108, a racker carriage track structure 110, and a v-door 120 into the drilling rig 101. The v-door 120 is arranged to receive tubulars or stands introduced to the rig 101. The fingerboard 108 includes a fingerboard frame 126 that supports and carries fingers (not shown) that define openings therebetween for receiving tubular stands. The racker device 104 may move from the position shown toward the mast 106 and may transfer tubulars between the v-door 120, the fingerboard 108, and well-center 116, or other location, such as off-line mouseholes, disposed about the rig 101. In this embodiment, the mast 106 is disposed over and about well-center 116 and supports a plurality of drilling components of a drilling system, shown here as a top drive 124 and its components disposed and moveable along a support column 125. Other drilling components are also contemplated. It should also be noted that a column racker may be integrated beneath the diving board/fingerboard utilizing an offline parking system as described in U.S. patent application Ser. No. 14/279,986, filed May 16, 2014, titled Parking System for Pipe Racker on a Drilling Rig, incorporated herein by reference.

Still with reference to FIG. 1, the racker device 104 includes a racker upper drive carriage 140, a modular racker hoist 142, a lower drive carriage 144, an upper column drive 146, and a racker support column 148. Drill pipe stands 150 are shown in FIG. 1 and may be transferred by the racker device 104 on the rig based structures and supports 102 into and out of the fingerboard 108, and transferred into or out of the well-center 116.

The racker support column 148 may be formed of a single beam or multiple beams joined together. In some embodiments, the racker support column 148 is a structural support along which the column drive 146 may move upward or downward on rollers, slide pads, or other elements.

In some exemplary embodiments, the upper drive carriage 140 is configured to move the upper portion of the racker support column 148 along the racker carriage track structure 110. The upper drive carriage 140 may include rollers, sliding pads, or other structure that facilitates it moving, along with the racker device 104 of which it is a part, between the v-door 120 and well center 116 below the mast 106. In some embodiments, the upper drive carriage 140 is a part of a chain structure that drives the racker device 104 along a passageway formed to accommodate the racker device 104 through the fingerboard 108. In addition, it may cooperate with or may include the racker hoist 142 and may be configured to operate the racker hoist 142 to raise and lower the upper column drive 146 along the racker support column 148. That is, the racker hoist 142 may be in operable engagement with the upper drive carriage 140 and may be driven by the upper drive carriage 140. It moves the upper column drive 146 up or down in a vertical direction along the racker support column 148.

The lower drive carriage 144 and the upper column drive 146 cooperate to manipulate tubulars and/or stands. In this embodiment, the lower drive carriage 144 includes a drive system that allows the lower drive carriage 144 to displace along the rig floor. In some embodiments, this occurs along rails, tracks, or other defined pathway. The upper column drive 146 and the lower drive carriage 144 respectively include racker arms, referenced herein as a lower tubular interfacing element 154 and an upper tubular interfacing element 156. Each includes a manipulator arm 158 and a gripper head 160. The gripper heads 160 may be sized and shaped to open and close to grasp or retain tubing, such as tubulars or stands. The manipulator arms 158 may move the gripper heads 160 toward and away from the racker support column 148. These upper and lower tubular interfacing elements 156, 154 are configured to reach out to insert a drill pipe stand into or remove a drill pipe stand from fingerboard 108. That is, the upper and lower tubular interfacing elements 156, 154 extend outwardly from the racker support column 148 to clamp onto or otherwise secure a drill pipe stand that is in the fingerboard 108 or to place a drill pipe stand in the fingerboard. In addition, the upper and lower tubular interfacing elements 156, 154 are configured to reach out to receive tubulars introduced to the rig through the v-door 120 and to carry tubulars or stands from the v-door 120 or the fingerboard 108 to well-center 116 for hand-off to the drilling elements, such as the top drive 124. As indicated above, the column drive 146 may move vertically up and down along the racker support column 148. In some aspects, it is operated by the hoist 142. Additional details of the drilling rig system may be found in U.S. application Ser. No. 14/159,722, filed Jan. 21, 2014, and incorporated herein by reference.

A rig control system 161 controls the racker device 104 and other rig components, while also communicating with sensors disposed about the rig 101. The rig control system 161 may evaluate data from the sensors, evaluate the state of wear of individual tubulars or stands, and may make recommendations regarding validation of tubulars for a particular use as a part of a drilling operation. In some embodiments, the rig control system 161 may be disposed on the rig 101, such as in a driller's cabin, may be disposed in a control truck off the rig 101, or may disposed elsewhere about the drilling site. In some embodiments, the rig control system 161 is disposed remote from the drilling site, such as in a central drill monitoring facility remote from the drill site.

A catwalk 162 forms a part of the rig system 100 and may be directly attached to or disposed adjacent the drilling rig 101. The catwalk 162 allows the introduction of drilling equipment, and in particular tubulars or stands, to the v-door 120 of the drilling rig 101. In some embodiments, the catwalk 162 is a simple, solid ramp along which tubulars may be pushed or pulled until the tubular can be grasped or secured by the upper tubular interfacing element 106 of the racker device 104. In other embodiments, the catwalk 162 is formed with a conveyer structure, such as a belt-driven conveyer that helps advance the tubulars toward or away from the drilling rig. Other embodiments include friction reducing elements, such as rollers, bearings, or other structure that enables the tubulars to advance along the catwalk toward or away from the v-door 120. It should be noted that where land rigs utilize catwalks offshore rigs utilize conveyors to transport tubulars from the pipe deck to the drillfloor. Therefore it should be understood that the invention as described for use in a land rig can be utilized also in an offshore rig.

This embodiment also includes a sensing arrangement 170 (FIG. 5) disposed about the drilling rig structure that detects aspects of a tubular or stand. These sensed aspects represent information that may be used to determine specification characteristics of a tubular, such as lengths and weight for example, usable to validate the technical specifications of the tubulars. In the embodiments described herein, the sensing arrangement 170 includes a length sensing arrangement and a weight sensing arrangement. The length sensing arrangement may be used to check or confirm the total length of the tubular, the effective length of the tubular, and/or the length of a threaded pin connector based on the tool joint location, for example. As used herein, the total length of the tubular is the length from one end of the tubular to the other. The effective length of the tubular is the length of the tubular without the threaded pin connector length. Accordingly, the summed length of the effective length and the threaded pin connector length is equal to the total length. The weight sensing arrangement may be used to check or confirm the weight of the tubular.

The sensing arrangement 170 is built-in or added on the structure described above and shown in FIG. 1 and in at least some embodiments, is configured to detect or sense an aspect of the tubular while on-the-fly. Therefore, the system may detect aspects of the tubular in the normal course of operation of introducing the tubular to the rig 101, lifting the tubular, manipulating the tubular, or taking other action. As used herein, detecting measurements on the fly encompasses instances where the elements, such as the racker device 104, pauses for a moment of time to permit the detection to occur in a relatively static condition to improve accuracy. Detecting aspects on the fly also includes detecting or calculating measurements, such as the distance between ends of the tubular for example, in real time with the tubular in motion. This may be accomplished by, for example, calculating the distance between stop plates that may form a part of the racker device 104 even as the racker device 104 carries the tubular during a manipulation process.

The sensing arrangement 170 comprises one or more sensors that may be formed of a transducer, encoder, or other element, that is able to output a signal representative of an aspect of a tubular, such as a location, position, or measurable specification such as length or weight of a tubular or a part of the tubular.

Figure 2:
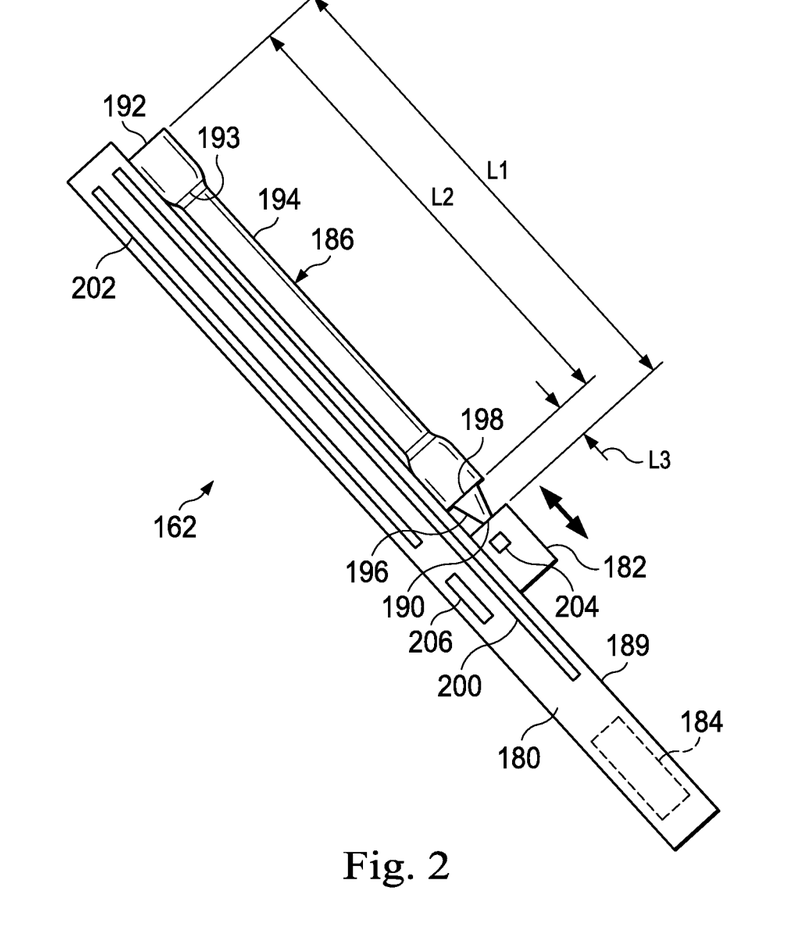
FIG. 2 is a schematic of a catwalk portion an exemplary apparatus according to one or more aspects of the present disclosure.

FIG. 2 shows the catwalk 162 in greater detail and carrying an exemplary tubular. The catwalk includes a main body 180, a skate 182, a power system 184, and the plurality of sensors making up the sensing arrangement 170. The main body 180 is configured to carry or support a tubular as it is advanced from a lower elevation, such as a ground level position or a sea level position to a higher elevation, such as the v-door 120 of the drilling rig 101. The main body 180 also supports tubulars as they are moved from the rig to a lower elevation. Naturally, depending on the need, the catwalk may be used to support tubulars or stands of tubulars as they are conveyed along the main body 180 to any desired location irrespective of elevation. The main body 180 includes upper surface 189 arranged to directly contact or carry the tubular. In FIG. 2, an exemplary tubular is referenced by the numeral 186. Depending on the embodiment, the upper surface 189 supporting the tubular 186 may be fixed in place, or may move in the longitudinal direction of the catwalk 162. For example, when the upper surface 189 is fixed, the tubular 186 slides along the surface as it moves along the catwalk 162. When the upper surface 189 moves, the tubular may be may be carried by, and the upper surface 189 may be formed of a conveyer, such as a belt, track, or chain that may convey the tubular 186 along the length of the catwalk 162. Some embodiments have a groove, depression, or channel in the upper surface 189 that may guide the tubular 186 as it is advanced along the catwalk 162 toward or away from the v-door 120 of the drilling rig 101.

The skate 182 is connected to and driven by the power system 184. The skate 182 moves along the upper surface 189 in the longitudinal direction and provides the force required to either advance the tubular 186 along the catwalk 162 or to support the tubular 186 as it moves upward along the conveyer. Accordingly, in use, the tubular 186 abuts against the skate 182 and is moved by the skate 182 as it longitudinally advances along the catwalk 162. Accordingly, the skate 182 is a support for and carries some of the weight of the tubular 186 as the tubular moves along the catwalk 162 in either an up or a down direction. The power system 184 may be a motor that drives a chain, belt, or other system to drive the skate 182.

The plurality of sensors making up the sensing arrangement 170 on the catwalk 186 are arranged to detect or sense the position of the tubular 186 by detecting the location of the tubular ends and detecting the location of the tool joint shoulder. As described further below, these are in communication with a pipe validation system configured to calculate a length or other information relating the tubular 184 based on the sensed information. For ease of reference and understanding, the tubular 186 in FIG. 2 includes a bottom end 190, a top end 192, a top end tool joint shoulder 193, a main body 194, a threaded pin connector 196, and a tool joint shoulder 198 between the threaded pin connector 196 and the main body 194. The tubular 186 includes a total length L1, an effective length L2, and a threaded pin connector length L3. The tool joint is comprised of both the top end tool joint shoulder 193 on the upper box connection (female connection) and the lower tool joint shoulder 198 of the pin connector (male connection).

Still referring to FIG. 2, the sensors making up the sensing arrangement 170 include a bottom end sensor 200, a top end sensor 202, a tool joint sensor 204, and a weight sensor 206. The bottom end sensor 200 is disposed and configured to identify an aspect of the tubular 186, (in this case, the bottom end 190 of the tubular 186) as it moves along the catwalk 162 and through the v-door 120. In some embodiments, it does this by detecting or identifying the actual location of the bottom end 190. In other embodiments, it does this by detecting or identifying the position of the skate 182, which abuts against and provides a known location for the bottom end 190 of the tubular 186. In some embodiments, the bottom end sensor 200 is a series of sensors arranged to detect the presence of the location of the bottom end 190 or the location of the skate 182, with the distance from the skate 182 to the bottom end 190 also being known. In other embodiments, the bottom end sensor 200 is an encoder, such as a linear encoder that detects the position based on a scale either carried on the skate 182 or other moving element or disposed along the length of the catwalk 162. In some embodiments, the bottom end sensor 200 sensor is a proximity sensor that signals when the bottom end 190 of the tubular 186 passes by. In yet other embodiment, the bottom end sensor 200 is a load cell that identifies the location of the bottom end 190 of the tubular 186 because the load changes. Other sensing arrangements are contemplated that are capable of identifying the bottom end 190 of the tubular 186 as it advances along or is disposed on the catwalk 162. In some embodiments, the bottom end sensor 200 is one where the skate 182 is stopped at or passes by a known position indicating the bottom end 190 of the tubular 186.

The top end sensor 202 is disposed and configured to identify an aspect of the tubular 186 (in this case, the top end 192 of the tubular 186) as it moves along the catwalk 162 and through the v-door 120. In some embodiments, it does this by detecting or identifying the actual location of the top end 192. In other embodiments, it does this by detecting or identifying the position of a reference element associated with or a known distance from the top end 192. In some embodiments, the top end sensor 202 is a series of sensors arranged to detect the presence of the location of the top end 192. In some embodiments, the top end sensor 202 is a proximity sensor that signals when the top end 192 of the tubular 186 passes by. In yet other embodiment, the top end sensor 202 is a load cell that identifies the location of the top end 192 of the tubular 186 because the load changes. Other sensing arrangements are contemplated that are capable of identifying the top end 192 of the tubular 186 as it advances along or is disposed on the catwalk 162. In some embodiments, the top end sensor 202 is one where the top end 192 is stopped at or passes by a known position, such as the end of the catwalk 162.

The tool joint sensor 204 is disposed and configured to identify an aspect of the tubular (in this case the tool joint shoulder 198 of the tubular 186) to determine the threaded pin connector length L3 directly or indirectly. It may do this by sensing the position of the tool joint shoulder 198 of the tubular 186 as it moves along the catwalk 162. Depending on the embodiment, the tool joint sensor 204 may be disposed on the main body 180, the skate 182, or elsewhere on the catwalk 162. In FIG. 2, the tool joint sensor 204 is carried on the skate 182. In this embodiment, the skate 182 may be configured to receive all or a part of the threaded pin connector 196 of the tubular 186, and the tool joint sensor 204 may be disposed along the threaded pin connector 196 to identify the location of the tool joint shoulder 198, directly or indirectly. When disposed on the main body 180, the tool joint sensor 204 may detect or identify the actual location of the tool joint shoulder 198. In other embodiments, it does this by detecting or identifying the position of a reference element associated with or a known distance from the tool joint shoulder 198.

The weight sensor 206 is disposed and configured to sense or measure a weight aspect of the tubular 186 on the catwalk 162. This provides information relating to wear, tubular thickness, and tubular strength. Thus, tubulars worn by exposure to abrasive materials may be identified by their loss of mass, and may need to be replaced with tubulars having a longer remaining useful life.

The bottom end sensor 200, the top end sensor 202, the tool joint sensor 204, and the weight sensor 206 all communicate with a control system, referenced herein as a tubular validation system, which will be discussed below with reference to FIG. 5. The control system may take the information provided by the plurality sensors making the sensing arrangement 170 and calculate one or more of the total length L1, the effective length L2, the threaded pin connector length L3, and the tubular weight. It may then compare that with stored values to determine whether any of the lengths or the weight is out of an acceptable range.

FIG. 3 shows a portion of the racker device 104 accepting the tubular 186 from the catwalk 162. Here the racker device 104 includes a top end sensor 210. In this example, the top end sensor 210 is disposed on the gripper head 160 of the upper column drive 146. The top end sensor may be similar to or the same type of sensors discussed above and may be configured to detect a position of the top end of the tubular 186. In some embodiments, the top end sensor 210 is a sensor, such as one or more encoders disposed at joints between the gripper head 160 and the manipulator arm 158 and between the manipulator arm 158 and the body portion of the upper column drive 146, along with a sensor configured to determine the height of the upper column drive 146. Using information from these sensors, the location of the gripper head 160 may be determined and likewise, the location of the top end of the tubular 186. As described above, the top end sensor 210 may be a proximity sensor that identifies where the top end of the tubular 186 is located as it is carried in the gripper head 160. Some embodiments include the top end sensor 210 as a part of a plurality of encoders that indicate the position of the different elements of the racker device, such as the position of the upper column drive 146, the manipulator arm 158, and the gripper head 160, as mentioned above.

Accordingly, in the exemplary embodiment shown in FIG. 3, the top end sensor 210 of the racker device 104 cooperates with the bottom end sensor 200 and the tool joint sensor 204 of the catwalk 162. These provide the information needed to calculate one or more of the total length L1, the effective length L2, and the threaded pin connector length L3. The control system may then compare that with stored values to determine whether any of the lengths are out of an acceptable range.

FIG. 4 shows the pipe racker device 104 carrying a tubular 186. While FIG. 4 will be described with reference to a tubular, it should be apparent that the system will work equally as well with a stand of tubulars to detect lengths or weight. In FIG. 4, the plurality of sensor making up the sensing arrangement includes one or more top end sensors 210, a hoist sensor 212, a bottom end sensor 214, and a tool joint sensor 216, and a weight sensor 218.

In FIG. 4, the racker device 104 is arranged to make validation measurements while the tubular or stand is upright or vertical. During tripping and casing operations, stands or tubulars removed from the well bore can be validated by securing the stands beneath a shoulder of the drill pipe and placing the stand on the drill floor. Utilizing the hoist sensor 212 on the racker hoist 142 and/or the top end sensor 210, the system is configured to sense an aspect of the tubular, such as the height of the gripper head 160, and therefore, the height of the top end 192 of the tubular or stand. For example, the racker device 104 may be arranged to place the bottom end 190 of a tubular 186 or a stand on a floor plate of the drilling rig 101 and then detect or sense the location of the top end 192 either directly or based on the detected position of the upper column drive 146, the manipulator arm 158, and/or the gripper head 160. With the location of the bottom end 190 either detected or sensed by a sensor or simply in contact with a known location, like a stop plate on the rig floor, the height of the tubular 186 can be determined.

In this case, the top end sensor 210 may be as described above, with one or a series of sensors, such as rotary encoders that detect the position of the gripper head 160 by detecting the position of the upper column drive 146, the manipulator arm 158, and the gripper head 160. The position of the gripper head 160 and the top end of the tubular may then be calculated from these inputs. Other arrangements are contemplated.

Depending on the embodiment, the bottom end sensor 214 on the racker device may be used to sense an aspect of the tubular as the location of the bottom end 190 of the tubular 182. As mentioned above, while some embodiments use a known positional location, such as a stop plate, other embodiments use a sensor to determine or identify the location of the bottom end 190. In one example, the bottom end sensor 214 is used to confirm that the tubular is in contact with the tubular being carried or supported by the racker device 104. For example, a load sensor may be used to determine that the tubular bottom end 190 is in resting on a floor plate on the drilling rig 101.

The tool joint sensor 216 is disposed either along the rig floor or along the gripper head 160 of the lower drive carriage 144. Therefore, while the tubular 186 is being carried or while the tubular is stationary, the sensor 216 may sense an aspect of the tubular such as the bottom end 190 of the tubular and detect the location of the tool joint shoulder as described with reference to other tool joint sensors herein.

FIG. 4 shows the weight sensor 218 disposed on the gripper head 160. It is configured to measure or detect the weight aspect of the tubular 186 of the stand of tubulars. As indicated above, this provides information relating to wear, tubular thickness, and tubular strength. Thus, tubulars worn by exposure to abrasive materials may be identified by their loss of mass, and may be replaced with tubulars having a longer remaining useful life. In the embodiment shown the weight sensor 218 is configured to detect the tubular weight while the tubular is suspended from the gripper head 160. However other arrangements are contemplated. In an alternative example, the weight sensor 218 is disposed on the rig floor or on a floor scale and the racker device 104 may temporarily place the tubular 186 on the scale or on the weight sensor 218. Other arrangements for measuring the weight of the tubular are also contemplated.

FIG. 5 is a block diagram showing some elements of the system 100 including the rig control system 161, the racker device 104, and the catwalk 162. In this embodiment, the rig control system 161 controls the racker device and the catwalk 162, and also validates specifications of tubulars and stands, one at a time, as they are loaded or introduced to the drilling rig 101 or as they are manipulated about the rig 101. Although described with reference to the system 100 above, the rig control system 161 may operate with other rig systems having different setups and component arrangements than those described in the paragraphs herein.

The rig control system 161 includes a tubular validation system 242 configured to monitor and track the specifications, standards, wear, and condition of individual tubulars and stands. It may track and store information that may be used to determine specification characteristics of a tubular, such as lengths and weight for example, usable to validate the technical specifications of the tubulars. These specification characteristics may include, for example, an effective length, a total length, a threaded pin connector length, and weight. It may also track and store information relating to prior use, prior applied stresses, prior locations within a drill string, and other information relating to wear on the tubular or stand. Using this information, the tubular validation system 242 assesses a tubular and determines whether the tubular is satisfactory for continued use or whether it is compromised in some manner and must be further inspected or discarded. In some embodiments, this information may also be provided to a tubular management system and a larger asset management system that may allocate a location for the tubular within a drill string, and/or a location within a fingerboard, based on the remaining strength and durability of a particular tubular or stand. Additional information relating to an exemplary tubular management system and an exemplary asset management system that may be used in conjunction with the tubular validation system may be found in U.S. patent application Ser. No. 14/184,771, filed Feb. 20, 2014, and incorporated herein by reference in its entirety. In some embodiments, the tubular validation system forms a part of a tubular management system or asset management system.

The tubular validation system 242 includes a memory 244, a processor 246 and an operator interface 248. The processor 246 may be an integrated circuit with power, input, and output pins capable of performing logic functions, or may be a controller that controls different components that perform different functions. The processor 246 may be any processor known in the art and may be comprised of multiple processors and may be a part of or may be formed of other types of controllers known in the art.

The memory 244 may be a semiconductor memory that interfaces with the processor 246 or any other memory capable of storing information or instructions to be accessed by the processor 246. In one example, the processor 246 can write to and read from the memory 244. For example, the processor 246 can be configured to read data relating to the system operation and write that data to the memory 244. The processor 246 is also capable of performing other memory functions, such as erasing or overwriting the memory 244, detecting when the memory 244 is full, and other common functions associated with managing semiconductor memory. In some aspects, the memory 244 includes executable programs, data, processes, and instructions for creating a tubular management plan for storing tubular stands and/or for the makeup or breakdown of tubular stands. It also may include executable programs, data, processes, and instructions for acting on data received from the sensors disposed about the rig to validate tubulars or stands and determine the amount of wear or stress previously applied on the tubular or stand as determined by changes in lengths or weight. In some embodiments, the memory 244 encompasses local memory and larger database memory that stores information relating to system operation, component data, or other information.

The operator interface 248 allows an operator to input and receive information relating to tubular specifications, standards, settings, or other information that may be useful or should be considered by the tubular validation system 242. This may include any input device and any output device known in the art, including keyboards, mice, knobs, switches, and display screens, among others.

The tubular validation system 242 may be disposed proximate or remote from other elements of the rig control system 161. In some embodiments, the tubular validation system 242 shares a common memory and processor with the remainder of the rig control system such that the tubular validation system 242 and the rig operating systems are both processes operating on the same server or computer. In other embodiments, the tubular validation system 242 is located remote from other aspects of the rig control system 161 and they may communicate using any networking medium.

In some embodiments, the tubular validation system 242 receives and stores information or data from the sensors making up the sensing arrangement 170 disposed about the rig 101, including on the racker device 104 and the catwalk 162. It may also receive and store information relating to prior measurements of a particular tubular, specifications of tubulars that are new for a specific size, type, or grade of tubular, wear or deformation limits or thresholds that indicate a tubular may be unfit for use in a particular location of a drill string or may unsuitable for further use anywhere within a drill string. Using this information the tubular validation system 242 may be able to accept or reject a specific tubular, and also may be able to provide estimation indicative of the useful life of a particular tubular or stand. For example, the information stored in the tubular validation system 242 may include wear data and applied stress data relating to specific tubulars. Based on the information, the tubular validation system 242 may act to reduce the amount of stress on specific tubulars by allocating them a location in the drill string with lower stress or wear than other locations in the drill string.

The rig control system 161 communicates with the racker device 104 and/or other components on the rig system 100 to carry out a racking plan. The rig control system 161 may communicate signals, instructions, or other information to operate the racker device 104 in a manner to execute the racking plan. In some embodiments, the rig control system 161 sends signals or control signals to the racker hoist 142, the manipulator arm and gripper heads 154, 156, the upper drive carriage 140, the lower drive carriage 144, and the upper column drive 146. Under the control of the rig control system 161, the racker device 104 may operate to carry out a drill plan, may cooperate with the catwalk 162 to receive tubulars onto the drilling rig 101 or remove tubulars from the drilling rig, manipulate or move tubulars or stands about the rig 101, including making up stands, breaking down stands, introducing to or removing tubulars or stands from well center. It is worth noting some exemplary embodiments have an integrated rig control system that cooperates with, forms a part of, of or includes the rig control system 161. This system may utilize a well plan input and may control components of a rig, such as a top drive, mud pumps, drawworks, roughnecks, hydraulic elevators, slips, solids control, power systems, anti-collision, and auxiliary functions. The integration or cooperation of the rig control system and the rig control system may result in a fully automated rig with autonomous control capability. In some aspects, this automated rig would not require driller input other than specified settings and would allow the driller to transition into an oversight position ensuring the rig and controls are acting according to the prescribed well plan.

The tubular validation system 242 also communicates with and receives information from the top end sensor 210, the hoist sensor 212, the bottom end sensor 214, the tool joint sensor 216, and the weight sensor 218. Using information from these sensors, the tubular validation system may determine the current effective length of the tubular, the total length of the tubular, the threaded pin connector length, and the current weight of the tubular. This information may be compared to prior information stored within the memory 244 to determine the changes in the lengths or weight and provide information relating to the remaining useful life of the tubular or stand.

The rig control system 161 also communicates with the catwalk 162 of the rig system 100. It may communicate signals, instructions, or other information to operate the catwalk 162 in a desired manner to introduce or remove tubulars or stands from the rig 101. In some embodiments, the rig control system 161 sends signals or control signals to power system 184 which may drive the skate 182 (FIG. 2) to move the skate along the main body 180 of the catwalk 162 to move a tubular or stand onto the rig or to take the tubular or stand off the rig. Other features of the catwalk 162 may also be controlled by the rig control system, including features such as elevators, rams, actuators, loaders, and other features of the catwalk 162.

The tubular validation system 242 also communicates with and receives information from the top end sensor 200, the bottom end sensor 202, and the tool joint sensor 204. Using information from these sensors, the tubular validation system may determine the current effective length of the tubular, the total length of the tubular, the threaded pin connector length, and the current weight of the tubular. This information may be compared to prior information stored within the memory 244 to determine the changes in the lengths or weight and provide information relating to the remaining useful life of the tubular or stand.

While shown as a part of the tubular validation system, it should be noted that many embodiments have the summation and calculation of lengths and widths performed at intermediary controllers disposed about the drilling rig or at other locations.

Figure 6:
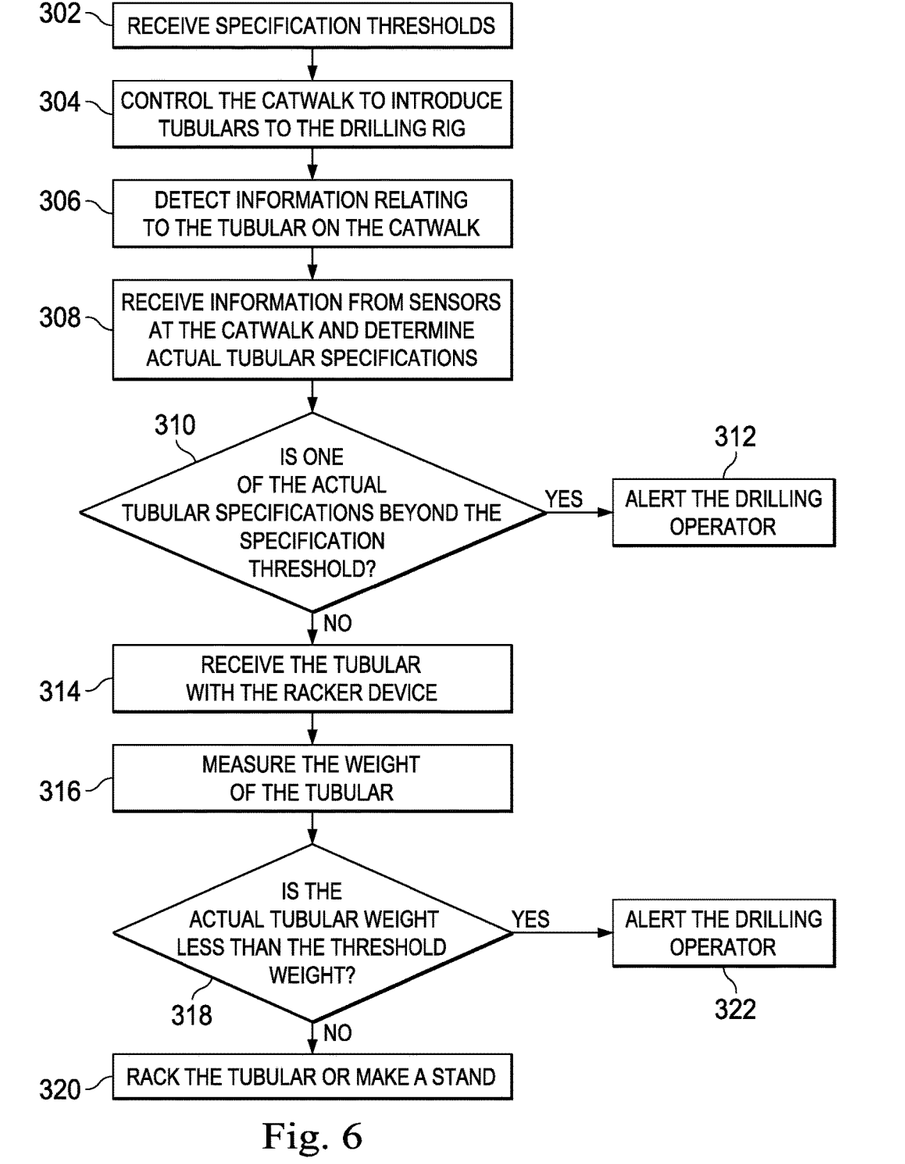
FIG. 6 is a flow-chart diagram of at least a portion of a method according to one or more aspects of the present disclosure.

FIG. 6 is a flow chart showing an exemplary method for validating a tubular for use in a drilling operation. The method may be performed, for example, by the rig control system 161 including the tubular validation system 242. The method begins at 302 with the tubular validation system receiving specification thresholds. Specification thresholds are the limits for a tubular which indicate the tubular is no longer suitable for continued use. In this embodiment, at least some of the specification limits correspond to the information discussed herein, including effective length, total length, threaded pin connector length, and tubular weight. However, other specification thresholds may also be used, including information relating to induced stresses, number of times used, location of use within a drill string, and other information. This specification information may be selected based on the type of tubular being used, such as a tubular model, or may be individualized to a specific tubular based on the tubular's history or other factors.

At 304, the rig control system controls the catwalk 162 to introduce tubulars to the drilling rig. This includes receiving a tubular onto the catwalk 162 and controlling the power system 184 to advance the tubular toward the rig. As such, the skate 182 advances toward the tubular until it engages the bottom end 190 of the tubular.

At 306, the tubular validation system controls the sensors to detect information or aspects relating to the tubular on the catwalk. This may include activating the bottom end sensor 200, the top end sensor 202, the tool joint sensor 204, and the weight sensor 206. The bottom end sensor 200 may detect the position of the bottom end 190 directly by detecting the actual location of the bottom end 190, or may detect the position of the bottom end 190 indirectly by detecting the position of a reference, such as the position of the skate 182. With the position and dimensions of the skate 182 known, the bottom end 190 of the tubular can be easily calculated. Accordingly, even in such embodiments, the bottom end 190 of the tubular 186 is effectively being detected. It is worth noting that in all embodiments and with all sensors discussed herein, they may be arranged to indirectly detect the position of a position of the tubular if the location or position of the tubular is calculated based on the detected information. In one embodiment, a single sensor operates as the top end sensor, the tool joint sensor, and the bottom end sensor by determining location as the relevant part of the tubular passes the sensor, and by measuring the travel of the skate during the relevant time between measurements.

Likewise, the tubular validation system 242 receives information from the top end sensor 202 and the tool joint sensor 204. The top end sensor 202 detects the position of the top end 192 and the tool joint sensor 204 detects the position of the tool joint shoulder 198. The arrangement of the sensors and their accuracy may enable the detection to occur simultaneously to provide a single real-time snapshot of the tubular position without stopping the movement of the tubular. Accordingly, the tubular may be measured on the fly while on the catwalk. In other embodiments, the tubular is maintained in a static position for a moment sufficiently long to obtain the positional information of the top end, the bottom end, and the tubular joint shoulder.

In some embodiments, the weight sensor 206 may measure or determine the weight of the tubular. The tubular validation system 242 receives information from the weight sensor 206.

At 308, the tubular validation system 242 may receive the detected information from the sensor and determine the actual tubular specifications, such as length and weight. This may be accomplished simply by calculating the distance between the top end and the bottom end of the tubular to calculate the total length. The effective length may be calculated by simply subtracting the length of the threaded pin connector from the total length, or by simply calculating the distance between the tool joint shoulder and the top end. Likewise, the threaded pin connector length can also be easily determined by sustaining the effective length from the total length, by determining the distance between the tool joint shoulder and the bottom end. Depending on the embodiment, the weight may be directly measured.

At 310, the tubular validation system 242 compares the actual tubular specification to the threshold specifications to determine whether the tubular is suitable for continued use. If the one of the actual tubular specifications is beyond the specification threshold, then the tubular is not suitable for continued use and should be flagged to be discarded, or in some embodiments, the tubular may be designated for use only in a certain application, such as a low stress application. By way of example, if the effective length of the tubular has exceeded a length threshold, the tubular may have already inelastically yielded due to previously applied strain. If the strain has exceeded a certain threshold, then the tubular will have a shortened useful life or its useful life will have already expired. This may indicate that further use of the tubular would risk breaking the tubular down-hole, which would be expensive to repair and cause needless rig downtime. Likewise, if the weight is below the threshold, the tubular may have worn due to abrasive fluid flow or other factor to the point where it is no longer suitable for use. A tubular that has a total weight lower than the threshold may have significant internal wear, and the tubular wall may have weak points or locations that are not visible on the exterior. Accordingly, by detecting the weight, the remaining useful life of the tubular may be estimated.

Accordingly, at 312, if one of the actual tubular specifications is beyond the specification threshold for the tubular, then the tubular validation may alert a drilling operator or may take other action. In some embodiments, alerting the drilling operator includes displaying an alert on a display screen. It may also include a visual indicator such as a flashing light on the catwalk 162. It may also emit an audible indicator via a speaker to notify a user that the tubular should be redirected to a particular application or discarded. In some embodiments, the rig control system may be configured to automatically take action by removing the tubular from the catwalk.

At 314, if one of the actual tubular specifications is not beyond the specification threshold for the tubular, then the tubular may be received onto the drilling rig 101 and may be accepted by the racker device 104. This may include handing the tubular to the racker device 104. The racker device 104 may receive the top end of the tubular in the gripper head 160 and may lift the tubular from the catwalk 162 so that that tubular is at least partially suspended by the top end.

It is worth noting that some embodiments employ sensors on both the racker device and the catwalk at the same time to detect the positions of features of the tubular or to measure the lengths of the tubulars in the manner discussed herein.

If the weight was not sensed previously at the catwalk 162, it may be sensed at the racker device 104, as described herein. At 316, with the tubular being handled by the racker device 104, the racker device may use the weight sensor 218 to detect the actual weight of the tubular. This may be accomplished by holding the tubular from the top end so that the tubular hangs from the gripper head 160. With all the weight being carried by the manipulator arm 158 and gripper head 160, the weight sensor 218 can determine the actual weight of the tubular. In other embodiments, the tubular may be placed on a scale or other sensor that detects weight in order to determine the weight of the tubular.

At 318, the tubular validation system compares actual tubular weight to the threshold weight of the threshold specification to determine whether the tubular is suitable for continued use. As indicated above, a tubular that has a total weight lower than the threshold may have significant internal wear, and the tubular wall may have weak points or locations that are not visible on the exterior. Accordingly, by detecting the weight, the remaining useful life of the tubular may be estimated.

If at 318 the actual tubular weight is less than the threshold weight for the tubular, then the tubular may have limited useful life and the tubular validation system 242 alerts the operator at 320 in the manner discussed above. The racker device 104 may then rack the tubular for storage in a location separate from the other tubulars or may remove it from the rig entirely.

If at 318 the actual tubular weight is not less than the threshold weight for the tubular, then the tubular may be racked for regular use with minimized concern that the tubular may fail early downhole or early on during a drilling operation.

Figure 7:
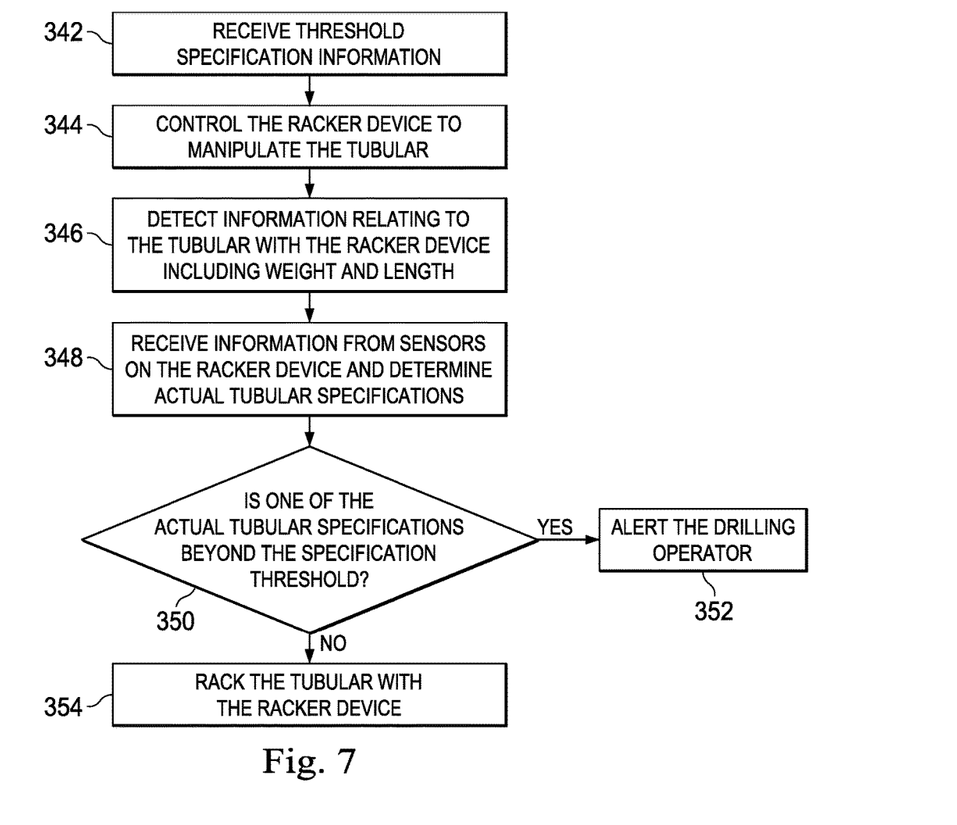
FIG. 7 is a flow-chart diagram of at least a portion of a method according to one or more aspects of the present disclosure.

While FIG. 6 presents an exemplary method for validating a tubular being introduced to a drilling rig with a catwalk, FIG. 7 sets forth an exemplary method of validating a tubular on a rig while being moved or handled.

FIG. 7 is an exemplary method that may be used after the tubulars are introduced and are on the drilling rig. The method begins at 342 when the tubular validation system 242 receives threshold specification information. This may be the same information received in step 302 of FIG. 6, and will not be reiterated here.

At 344, the rig control system operates the racker device 104 to manipulate tubulars in a regular manner. This may include building and breaking down stands, may include moving stands between a fingerboard and well center, may include building or introducing stands into a drill string, and may include tripping and casing operations where the stands are removed from the well bore.

At 346, the tubular validation system 242 detects information relating to the tubular with the sensors including weight and length. This may include obtaining information relating to the position of features of the tubular, including the location between the bottom end, the top end, and the tool joint shoulder of the tubular. These may be detected by the top end sensor 210, the hoist sensor 212, the bottom end sensor 214, the tool joint sensor 216, and the weight sensor 218. In some embodiments, detecting the location of features of the tubular is done on the fly, while in other embodiments, the racker device pauses during it normal movement to obtain a static reading of the positions. In some embodiments, the heights may be calculated by associating the top or bottom ends with a known location, such as by resting the bottom end on a floor plate and then measuring the location of the top end of the tubular. This then permits calculation of the total length of the tubular simply by taking the distance between the top end and the floor. The weight may be measured in the manner discussed above with reference to FIG. 6, by either a weight sensor such as a load cell on the upper drive carriage 140, or elsewhere on the upper column drive 146, or on the rig floor, such as on a scale on the rig floor.

At 348, the information from the sensors is received at the tubular validation system, which then calculates the total length of tubular, the effective length of the tubular, and the length of the tubular joint.

At 350, the tubular validation system 242 compares the actual tubular specification to the threshold specifications to determine whether the tubular is suitable for continued use. This is described further in the step 310 in FIG. 3. At 352, if the one of the actual tubular specifications is beyond the specification threshold for the tubular, then the tubular validation may alert a drilling operator or may take other action in the manner discussed above at 312. However, at 354, if one of the actual tubular specifications is not beyond the specification threshold for the tubular, then the tubular may be utilized in the drilling procedure and may be racked, built-up, introduced to well center or otherwise continued to be used.

Some embodiments store a tubular history in an asset management function that may permit users to track and analyze historical use or degradation of a particular tubular. Accordingly each time a particular tubular is accessed or used, its actual validation specifications may be recorded and stored. Therefore, the degree or wear resulting from any single procedure or use can be tracked and determined. This may allow users to better predict life cycle and help with inventory management and provide other advantages that may enable efficient and effective drilling while minimizing downtime of the rig system.

In the event of specification threshholds being beyond an acceptable threshold, some embodiments, automatically reject the tubular and replace it with another tubular. This allows the pipe handling process to continue without user intervention. In some aspects, the rejected tubular may then be examined manually later and, if acceptable, re-introduced to the tubular string. In some embodiments, automatic rejection and handling occurs without user intervention or notification.

Also, while the method above discusses detecting specifications while introducing tubulars to a rig, it should be understood that the invention is equally applicable to the instance where the tubular is being removed from the rig. Accordingly, the reverse operation can be used to validate tubulars as they are removed from the rig or as they are removed from well center.

In view of all of the above and the figures, one of ordinary skill in the art will readily recognize that the present disclosure introduces a drilling rig apparatus that includes a racker device structurally arranged to move a tubular or stand on a drilling rig, a catwalk structurally arranged to introduce a tubular or stand to the drilling rig, and a sensing arrangement cooperatively associated with at least one of the racker device and the catwalk and configured to sense an aspect of a tubular or stand while the tubular or stand is being handled at the drilling rig and to output a signal representative of the aspect of the tubular or stand. The drilling rig apparatus also includes a tubular validation system configured to receive the sensed aspect of the tubular or stand obtained by the sensing arrangement and to determine a specification characteristic of the tubular or stand based on the sensed aspect.

In an aspect, the specification characteristic is one of a tubular or stand total length, an effective length, a pin connector length, and a tubular or stand weight. In an aspect, the sensing arrangement comprises a weight sensing arrangement configured to automatically detect the weight of the tubular or stand and configured to communicate the weight to the tubular validation system. In an aspect, the sensed aspect of the tubular or stand comprises a position of at least one end the tubular or stand relative to a portion of the drilling rig. In an aspect, the sensed aspect of the tubular or stand comprises a position of a portion of the racker device or a portion of the catwalk relative to an end of the tubular or stand. In an aspect, the sensing arrangement comprises an encoder integrated into the catwalk and indicates a position representative of a bottom end of the tubular or stand relative to the catwalk. In an aspect, the sensing arrangement comprises a sensor carried on a racker arm of the racker and is configured to indicate a position representative of a top end of the tubular or stand relative to the racker arm. In an aspect, the sensor comprises a plurality of linear and rotary encoders disposed about the racker arm and usable to determine the position of the racker arm relative to the bottom end of the tubular or stand. In an aspect, the tubular validation system is configured to determine an effective tubular or stand length by subtracting the pin connector length from the total tubular or stand length. In an aspect, the tubular validation system comprises a memory, the tubular validation system being configured to receive and store the specification characteristic of the tubular or stand in the memory, configured to compare the specification characteristic to a stored threshold specification, and configured to alert an operator when the specification characteristic is beyond the stored threshold specification.

In another exemplary aspect, the present disclosure is directed to a drilling rig apparatus including a racker device structurally arranged to move a tubular or stand on a drilling rig, a length sensing arrangement cooperatively associated with the racker device and configured to sense a positional aspect of a tubular or stand while the tubular or stand is being operatively associated with the racker device and output a signal representative of the positional aspect of the tubular or stand, and a weight sensing arrangement cooperatively associated with the racker device and configured to sense a weight aspect of a tubular or stand while the tubular or stand is associated with the racker device and output a signal representative of the weight aspect of the tubular or stand. The drilling rig apparatus also includes a tubular validation system configured to receive the sensed positional aspect of the tubular or stand obtained by the length sensing arrangement and determine a specification characteristic indicative of a length of the tubular or stand based on the sensed positional aspect. The tubular validation system is also configured to receive the sensed weight aspect of the tubular or stand obtained by the weight sensing arrangement and determine a specification characteristic indicative of a weight of the tubular or stand based on the sensed weight aspect.

In an aspect, the tubular validation system is configured to configured to compare the specification characteristic indicative of length and the specification characteristic indicative of weight to stored threshold specifications. In an aspect, the tubular validation system is configured to output an alert to a system user when the specification characteristic indicative of length or the specification characteristic indicative of weight is outside of the stored threshold specifications. In an aspect, the drilling rig apparatus also includes a catwalk structurally arranged to introduce a tubular or stand to the drilling rig. The catwalk comprises a sensing arrangement configured to sense a positional aspect of a tubular or stand while the tubular or stand is being handled by the catwalk and output a signal representative of the positional aspect of the tubular or stand. The tubular validation system is configured to receive the signal output from the catwalk sensing arrangement and determine a specification characteristic indicative of a tubular or stand length. In an aspect, the sensing arrangement comprises an encoder integrated into the catwalk and indicates a position representative of a bottom end of the tubular or stand on the catwalk. In an aspect, the sensed positional aspect of the tubular or stand comprises a relative position of at least one end the tubular or stand. In an aspect, the sensed positional aspect of the tubular or stand handled by the racker device comprises a position of a portion of the racker device relative to an end of the tubular or stand. In an aspect, the sensing arrangement comprises a sensor carried on a racker arm of the racker and is configured to indicate a position representative of a top end of the tubular or stand. In an aspect, the racker device comprises a gripping mechanism configured to grip the tubular or stand, the weight sensing arrangement being disposed on the gripping mechanism.

In another exemplary aspect, the present disclosure is directed to a drilling rig apparatus that includes a catwalk structurally arranged to move a tubular or stand to a drilling rig and includes a length sensing arrangement cooperatively associated with the catwalk and configured to sense a positional aspect of a tubular or stand while the tubular or stand is operatively associated with the catwalk and output a signal representative of the positional aspect of the tubular or stand. The drilling rig apparatus also includes a weight sensing arrangement cooperatively associated with the catwalk and configured to sense a weight aspect of a tubular or stand while the tubular or stand is operatively associated with the catwalk and output a signal representative of the weight aspect of the tubular or stand. It also includes a tubular validation system configured to receive the sensed positional aspect of the tubular or stand obtained by the length sensing arrangement and determine a specification characteristic indicative of a length of the tubular or stand based on the sensed positional aspect. The tubular validation system also is configured to receive the sensed weight aspect of the tubular or stand obtained by the weight sensing arrangement and determine a specification characteristic indicative of a weight of the tubular or stand based on the sensed weight aspect.

In an aspect, the tubular validation system is configured to configured to compare the specification characteristic indicative of length and the specification characteristic indicative of weight to stored threshold specifications. In an aspect, the tubular validation system is configured to output an alert to a system user when the specification characteristic indicative of length or the specification characteristic indicative of weight is outside of the stored threshold specifications. In an aspect, the length sensing arrangement comprises an encoder integrated into the catwalk and indicates a position representative of a bottom end of the tubular or stand on the catwalk.

In yet another exemplary aspect, the present disclosure is directed to a method of validating a tubular or stand, comprising: sensing a location of an aspect of a tubular or stand or a weight of the tubular or stand supported on a portion of a drilling rig; communicating information indicative of the sensed location or weight to a tubular validation system; comparing the communicated information to a tubular or stand validation threshold in the tubular validation system to determine whether the tubular or stand meets specification criteria justifying use of the tubular or stand in a drilling operation; and notifying a user when the tubular or stand fails to meet the specification criteria.

In an aspect, the method includes determining a specification characteristic of the tubular or stand based on the communicated information and comparing the specification characteristic to the tubular or stand validation threshold. In an aspect, sensing a location of an aspect of the tubular or stand comprises sensing a first positional aspect of a portion of the tubular or stand and sensing a second positional aspect of a portion of the tubular or stand. In an aspect, sensing a first positional aspect comprises sensing a position of a first end of the tubular or stand and wherein sensing a second position aspect comprises sensing a position of a second end of the tubular or stand. In an aspect, communicating information comprises communicating a sensed weight to the tubular validation system, the tubular validation system being arranged to compare the communicated weight to a tubular or stand validation weight threshold to determine whether the tubular or stand meets weight criteria justifying use of the tubular or stand in a drilling operation.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A drilling rig apparatus comprising:
a catwalk structurally arranged to introduce a tubular or stand to the drilling rig;
a sensing arrangement cooperatively associated with the catwalk and configured to sense an aspect of a tubular or stand while the tubular or stand is being handled at the drilling rig and to output a signal representative of the aspect of the tubular or stand; and
a tubular validation system configured to receive the sensed aspect of the tubular or stand obtained by the sensing arrangement, to determine a specification characteristic of the tubular or stand based on the sensed aspect, and to validate the tubular or stand by comparing the determined specification characteristic to prestored information indicative of suitability for continued use of the tubular or stand.

2. The drilling rig apparatus of claim 1, wherein the prestored information comprises information relating to prior wear of the tubular or stand.

3. The drilling rig apparatus of claim 2, wherein the prior wear of the tubular or stand relates to at least one of prior use, prior applied stresses, and prior locations within a drilling string.

4. The drilling rig apparatus of claim 1, comprising an asset management system arranged to allocate a location in a fingerboard for the tubular or stand based on the suitability for continued use of the tubular or stand.

5. The drilling rig apparatus of claim 1, wherein the prestored information comprises a validation specification threshold indicative of whether the tubular or stand meets specification criteria justifying use of the tubular or stand in a drilling operation.

6. The drilling rig apparatus of claim 1, wherein the tubular validation system tracks the specification characteristics for each tubular or stand and references the tracked specification characteristics to determine suitability for continued use of the tubular or stand.

7. The drilling rig apparatus of claim 1, wherein the specification characteristic is one of a tubular or stand total length, an effective length, a pin connector length, and a tubular or stand weight.

8. The drilling rig apparatus of claim 1, wherein the sensing arrangement comprises a weight sensing arrangement configured to automatically detect a weight of the tubular or stand and configured to communicate the weight to the tubular validation system.

9. A drilling rig apparatus comprising:
a sensing arrangement cooperatively associatable with at least one of a racker device structurally arranged to move a tubular or stand on a drilling rig and a catwalk structurally arranged to introduce a tubular or stand to the drilling rig, the sensing arrangement being configured to sense an aspect of a tubular or stand while the tubular or stand is being handled at the drilling rig and to output a signal representative of the aspect of the tubular or stand; and
a tubular validation system configured to receive the sensed aspect of the tubular or stand obtained by the sensing arrangement, to determine a specification characteristic of the tubular or stand based on the sensed aspect, and to compare the sensed aspect to a stored threshold specification to indicate whether the tubular or stand is suitable for continued use.

10. The drilling rig apparatus of claim 9, wherein the tubular validation system comprises information relating to prior wear on the tubular or stand, the tubular validation system being configured to indicate whether the tubular or stand is suitable for continued use by comparing the determined specification characteristic and the information relating to prior wear to the tubular or stand.

11. The drilling rig apparatus of claim 10, wherein the information relating to prior wear of the tubular or stand relates to at least one of prior use, prior applied stresses, and prior locations within a drilling string.

12. The drilling rig apparatus of claim 9, comprising an asset management system arranged to allocate a location in a fingerboard for the tubular or stand based on the indicated suitability for continued use of the tubular or stand.

13. A drilling rig apparatus comprising:
a catwalk structurally arranged to introduce a tubular or stand to a drilling rig;
a sensing arrangement cooperatively associated with the catwalk and configured to sense an aspect of a tubular or stand while the tubular or stand is being handled and to output a signal representative of the aspect of the tubular or stand;

a tubular validation system configured to receive the sensed aspect of the tubular or stand obtained by the sensing arrangement, to determine one of a tubular or stand total length, an effective length, a pin connector length, and weight of the tubular or stand based on the sensed aspect; and an asset management system configured to receive and compare the determined one of a tubular or stand total length, an effective length, a pin connector length, and a weight of the tubular or stand to stored specifications obtained from previous measurements of the tubular or stand to indicate whether the tubular or stand is suitable for continued use.

14. The drilling rig apparatus of claim 13, wherein the asset management system is configured to allocate a location of the tubular or stand within a drill string or within a fingerboard based on the comparison.

15. The drilling rig apparatus of claim 13, wherein the sensing arrangement comprises a weight sensing arrangement configured to automatically detect a weight of the tubular or stand and configured to communicate the weight to the tubular validation system.

16. The drilling rig apparatus of claim 13, wherein the sensed aspect of the tubular or stand comprises a position of at least one end the tubular or stand relative to a portion of the drilling rig.

17. The drilling rig apparatus of claim 13, wherein the sensed aspect of the tubular or stand comprises a position of a portion of the catwalk relative to an end of the tubular or stand.

18. The drilling rig apparatus of claim 13, wherein the sensing arrangement comprises an encoder integrated into the catwalk and indicates a position representative of a bottom end of the tubular or stand relative to the catwalk.

19. The drilling rig apparatus of claim 13, wherein the tubular validation system is configured to determine an effective tubular or stand length by subtracting the pin connector length from the total tubular or stand length.

20. The drilling rig apparatus of claim 13, wherein the tubular validation system comprises a memory, the tubular validation system being configured to receive and store the determined one of a tubular or stand total length, an effective length, a pin connector length, and a tubular or stand weight of the tubular or stand in the memory, and configured to alert an operator when the one of a tubular or stand total length, an effective length, a pin connector length, and a tubular or stand weight is beyond the stored threshold specification.

* * * * *